United States Patent
Lim et al.

(10) Patent No.: US 10,158,609 B2
(45) Date of Patent: Dec. 18, 2018

(54) USER TERMINAL DEVICE, COMMUNICATION SYSTEM AND CONTROL METHOD THEREFOR

(71) Applicant: Samsung Electronics Co., Ltd., Suwon-si, Gyeonggi-do (KR)

(72) Inventors: Jung-hwan Lim, Hwaseong-si (KR); Sung-kee Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 15/037,847

(22) PCT Filed: Nov. 21, 2014

(86) PCT No.: PCT/KR2014/011240
§ 371 (c)(1),
(2) Date: May 19, 2016

(87) PCT Pub. No.: WO2015/099295
PCT Pub. Date: Jul. 2, 2015

(65) Prior Publication Data
US 2016/0294785 A1    Oct. 6, 2016

(30) Foreign Application Priority Data
Dec. 24, 2013   (KR) .................. 10-2013-0162857

(51) Int. Cl.
*H04L 29/06*   (2006.01)
*H04W 4/12*   (2009.01)
(Continued)

(52) U.S. Cl.
CPC ...... *H04L 63/0428* (2013.01); *G06F 21/6209* (2013.01); *H04L 51/04* (2013.01);
(Continued)

(58) Field of Classification Search
CPC ...... H04L 63/0428; H04L 51/04; H04W 4/12; H04W 4/14
See application file for complete search history.

(56) References Cited

U.S. PATENT DOCUMENTS

2003/0223586 A1*  12/2003  Green ................ H04L 63/029
                                                     380/283
2004/0015547 A1    1/2004  Griffin et al.
(Continued)

FOREIGN PATENT DOCUMENTS

| CN | 102932786 A | 2/2013 |
| KR | 10-2001-0035078 A | 5/2001 |

(Continued)

OTHER PUBLICATIONS

"Secure Texting—Password protect your text messages with text encryption—Secure Sms", 2 pages (Year: 2012).*
(Continued)

*Primary Examiner* — Thaddeus J Plecha
(74) *Attorney, Agent, or Firm* — Jefferson IP Law, LLP

(57) ABSTRACT

A user terminal device is disclosed. A user terminal device that supports an instant messenger service includes: a display unit for providing an instant messenger service screen including an output message; and a control unit for, when the output message is an encrypted message, decrypting the encrypted message according to a predetermined event and providing the decrypted message to the screen or another screen separate from the screen.

8 Claims, 17 Drawing Sheets

(51) Int. Cl.
  *H04W 4/14* (2009.01)
  *G06F 21/62* (2013.01)
  *H04L 12/58* (2006.01)
  *G06Q 50/30* (2012.01)

(52) U.S. Cl.
  CPC .............. *H04W 4/12* (2013.01); *H04W 4/14* (2013.01); *G06Q 50/30* (2013.01)

(56) References Cited

U.S. PATENT DOCUMENTS

| | | | | |
|---|---|---|---|---|
| 2004/0078595 | A1* | 4/2004 | Kent, Jr. | G06Q 10/107 713/160 |
| 2006/0105740 | A1* | 5/2006 | Puranik | H04M 3/16 455/410 |
| 2007/0156836 | A1 | 7/2007 | Kelso et al. | |
| 2008/0005325 | A1 | 1/2008 | Wynn et al. | |
| 2012/0262296 | A1* | 10/2012 | Bezar | G10L 17/26 340/573.1 |
| 2012/0282575 | A1* | 11/2012 | Solomon | G09B 5/06 434/95 |
| 2013/0077772 | A1* | 3/2013 | Lichorowic | H04M 1/271 379/88.02 |
| 2014/0067397 | A1* | 3/2014 | Radebaugh | G10L 13/08 704/260 |
| 2014/0101452 | A1* | 4/2014 | Wang | G06F 21/606 713/171 |
| 2015/0350895 | A1* | 12/2015 | Brander | H04L 51/04 455/411 |
| 2016/0314720 | A1* | 10/2016 | Kim | G06F 21/36 |

FOREIGN PATENT DOCUMENTS

| | | |
|---|---|---|
| KR | 10-1229216 B1 | 2/2013 |
| WO | 2013-183818 A1 | 12/2013 |
| WO | 2014/048352 A1 | 4/2014 |

OTHER PUBLICATIONS

Chinese Office Action dated Aug. 10, 2018; Chinese Appln. No. 201480070550.9.

* cited by examiner

USER TERMINAL DEVICE, COMMUNICATION SYSTEM AND CONTROL METHOD THEREFOR

TECHNICAL FIELD

The present general inventive concept generally relates to a user terminal device, a communication system, and a method for controlling the same, and more particularly, to a user terminal device that supports an instant messenger service, a communication system, and a method for controlling the same.

BACKGROUND OF THE INVENTION

In general, an instant messenger refers to software or hardware which enables two or more users to transmit a small amount of text data in real time. The instant messenger enables a user to register a talker and exchange a message with a talker in a talker list in a messenger screen. Recently, it became possible to use the messenger in a mobile communication terminal, as well as a Personal Computer (PC), and the use is getting rapidly increased.

With the increase of use of a mobile communication terminal, such as, a smart phone, user concern about personal information protection has been increased. Specially, as it became public that the instant messenger stores information on a personal conversation in a messenger sever, a concern about personal information leakage is getting increased. In this regard, major instant messenger providers are trying to prevent leakage of the personal conversation by encrypting and storing the personal conversation in the server such that a hacker cannot hack the information on the personal conversional from the server. However, there still remain a problem that the personal conversation could be leaked by sniffing in a network section between a personal terminal and a messenger server or by an ill-intentioned sever manager.

DETAILED DESCRIPTION OF THE INVENTION

The present disclosure has been provided to address the aforementioned and other problems and disadvantages occurring in the related art, and an aspect of the present disclosure provides a user terminal device that provides the conventional instant messenger service with an encryption function additionally, a communication system, and a method for controlling the same.

Means for Resolving the Problems

According to an embodiment of the present disclosure, there is provided a user terminal device that supports an instant messenger service. The device includes a display unit for providing an instant messenger service screen, a user interface for receiving a user interaction on the instant messenger service screen, and a control unit for, when a security mode for providing an encryption function is activated, encrypting text information inputted according to the user interaction and providing the encrypted text information as an input message of the instant messenger service.

When the security mode is inactivated, the control unit may provide the inputted text information as an input message of the instant messenger service without encryption.

The security mode may be activated according to a predetermined event before the text information is inputted in a message input box in the instant messenger service screen or activated according to a predetermined event after the text information is inputted.

The predetermined event may be an event in which a predetermined item is selected.

The input message may be transmitted to another user terminal device through a server for managing the instant messenger service.

According to an embodiment of the present disclosure, there is provided a user terminal device that supports an instant messenger service. The device includes a display unit for providing an instant messenger service screen including an output message and a control unit for, when the output message is an encrypted message, decrypting the encrypted message according to a predetermined event and providing the decrypted message to the instant messenger service screen or to another screen separate from the instant messenger service screen.

The encrypted message may be a message where text information inputted during activation of a security mode of a corresponding terminal is encrypted.

The control unit may provide the decrypted message in at least one area of the instant messenger service screen in at least one form of an opaque On Screen Display (OSD) form, a transparent OSD form, a window form separate from a window where the instant messenger service screen is provided, and a form where the decrypted message is provided to the instant messenger service screen directly.

The control unit may provide the decrypted message as a replacement of the encrypted message.

The predetermined event may be at least one of an event in which the encrypted message is received, an event in which an area where the encrypted message is displayed is selected, and an event in which a predefined menu item is selected.

When an instant messenger application supports an Application Program Interface (API) providing information on a received message, the control unit may decrypt acquired text information through the API.

When an instant messenger application does not support an Application Program Interface (API) providing information on a received message, the control unit may decrypt acquired text information through at least one of analysis of a drawing system for outputting the output message in the display and Optical Character Recognition (OCR) analysis on a captured image of the instant messenger service screen.

According to an embodiment of the present disclosure, there is provided a method for controlling a user terminal device that supports an instant messenger service. The method includes receiving a user interaction on an instant messenger service screen and encrypting, when a security mode for providing an encryption function is activated, text information inputted according to the user interaction and providing the encrypted text information as an input message of the instant messenger service.

The method may further include, when the security mode is inactivated, providing the inputted text information as an input message of the instant messenger service without encryption.

The security mode may be activated according to a predetermined event before the text information is inputted in a message input box in the instant messenger service screen or activated according to a predetermined event after the text information is inputted.

The predetermined event may be an event in which a predetermined item is selected.

According to an embodiment of the present disclosure, there is provided a method for controlling a user terminal device that supports an instant messenger service. The method includes providing an instant messenger service screen including an output message and decrypting, when the output message is an encrypted message, the encrypted message according to a predetermined event and providing the decrypted message to the instant messenger service screen or to another screen separate from the instant messenger service screen.

The providing the decrypted message may include providing the decrypted message in at least one area of the instant messenger service screen in at least one form of an opaque On Screen Display (OSD) form, a transparent OSD form, a window form separate from a window where the instant messenger service screen is provided, and a form where the decrypted message is provided to the instant messenger service screen directly.

The providing the decrypted message may include providing the decrypted message as a replacement of the encrypted message.

The predetermined event may be at least one of an event in which the encrypted message is received, an event in which an area where the encrypted message is displayed is selected, and an event in which a predefined menu item is selected.

The decrypting the encrypted message may include decrypting, when an instant messenger application supports an Application Program Interface (API) providing information on a received message, acquired text information through the API, and when the instant messenger application does not support the API providing information on a received message, decrypting acquired text information through at least one of analysis of a drawing system for outputting the output message in the display and Optical Character Recognition (OCR) analysis on a captured image of the instant messenger service screen.

According to an embodiment of the present disclosure, there is provided a communication system with first and second user terminal devices that support an instant messenger service. The communication system includes a first user terminal device for, when a security mode for providing an encryption function is activated, encrypting text information inputted according to a user interaction on an instant messenger service screen and providing the encrypted text information as an input message of the instant messenger service and a second user terminal device for, when an output message of the instant messenger service received from the first user terminal device is an encrypted message, decrypting the encrypted message according to a predetermined event and providing the decrypted message to the instant messenger service screen or to another screen separate from the instant messenger service screen.

Effect of the Invention

According to the above-described various embodiments, it is possible to protect user privacy through an encryption function with respect to an instant messenger service. In addition, the encryption function may be provided additionally without changing functions of the conventional messenger service or installing a new messenger application, thereby enhancing user convenience.

DETAILED DESCRIPTION OF THE PREFERRED EMBODIMENT

Certain embodiments are described in greater detail below with reference to the accompanying drawings.

Figure 1:
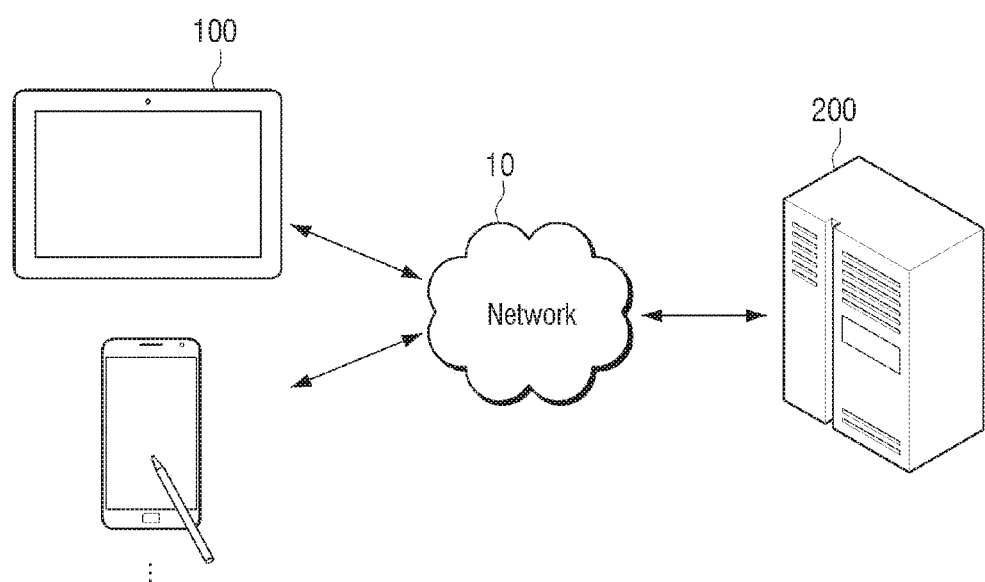
FIG. 1 is a diagram provided to describe a messenger service providing system according to an exemplary embodiment.

FIG. 1 is a diagram provided to describe a messenger service providing system according to an exemplary embodiment.

Referring to FIG. 1, a messenger service providing system according to an exemplary embodiment includes a user terminal device 100 and a server 200.

The user terminal device 100 may be realized as a mobile phone, such as, a smart phone, but not limited thereto. The user terminal device 100 may be realized as any type of device which is capable of providing a messenger service with a display function, for example, a tablet PC, a Portable Multimedia Player (PMP), a Personal Digital Assistant (PDA), a navigation, a digital television (TV), a PC, and so on. Meanwhile, when the user terminal device 100 is realized as a portable terminal, such as, a tablet PC, a PMP, a PDA, and a navigation, the user terminal device 100 includes a touch screen. Accordingly, the user terminal device 100 may be realized so as to execute a program by means of a finger or a pen (for example, a stylus pen), in this case.

The user terminal device 100 may be realized so as to communicate with the server 200 through a network 10 to provide a messenger service. Specially, the messenger service may be provided in a form of an application, that is, software used by a user in an Operating System (O/S), and the application may be provided in a form of an icon interface in a screen of the user terminal device 100. The messenger service refers to a service that supports real-time text communication of two or more users by means of a network including Internet. In this case, an instant messenger used in the service operates as a client of the service. The messenger service is called 'instant messenger' in that the messenger service supports immediate communication or is called 'internet messenger' in that the messenger service operates through the internet. The server 200 is a management server that supports an instant messenger service. The server 200 manages member registration and certification to support the instant messenger service between terminals. The functions of the server 200 are the same as functions of a server of the conventional instant messenger, and thus, a detailed description is omitted.

According to an exemplary embodiment, the user terminal device 100 provides a method for encrypting and transmitting a message according to the need, using the conventional instant messenger without change. Hereinafter, various exemplary embodiments will be described in detail with reference to the accompanying drawings, for convenience in explanation.

Figure 2A:
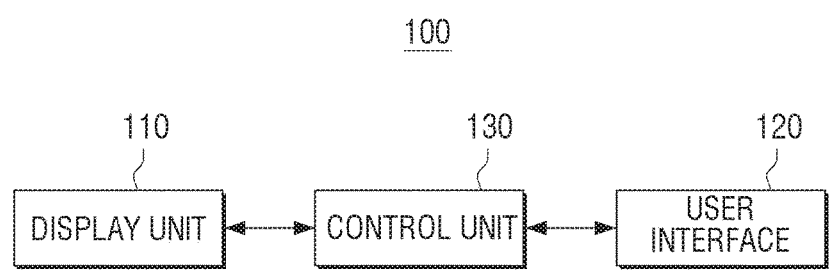
FIGS. 2A, 2B, and 2C are block diagrams illustrating structures of a user terminal device according to various exemplary embodiments.
Figure 2B:
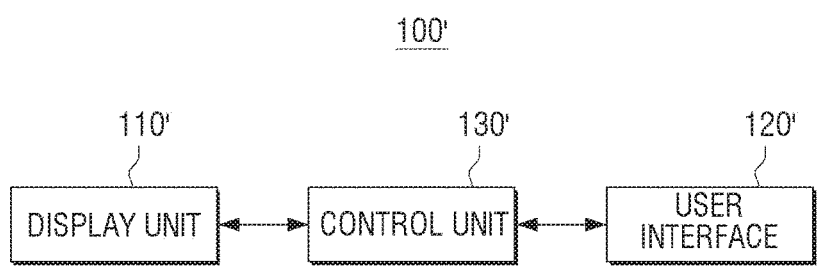

FIGS. 2A and 2B are block diagrams illustrating structures of a user terminal device according to various exemplary embodiments.

Referring to FIG. 2A, the user terminal device 100 a display unit 110, a user interface 120, and a control unit 130.

The display unit 110 displays a screen. In this case, the screen may include diverse contents, such as, an image, a moving image, text, music, and so on, an application execution screen including diverse contents, a Graphic User Interface (GUI) screen, and the like.

Specially, the display unit 110 may provide an instant messenger service screen. For example, when an application that supports the instant messenger service is executed by a user command, the display unit 110 may provide the instant messenger service screen.

The display unit 110 may be realized as a Liquid Crystal Display (LCD), an Organic Light-Emitting Diode (OLED), and the like, but not limited thereto. Specially, the display unit 110 may be realized as a touch screen which forms a mutual layer structure with a touch pad. In this case, the display unit 110 may be used as the user interface 120, as well as an output device. The touch screen may be realized so as to detect a pressure of a touch input, as well as a location and dimension of the touch input.

The user interface 120 receives various user commands.

Specially, the user interface 120 may receive diverse information, such as, text, an image, and the like, to be transmitted to a corresponding terminal, in the instant messenger service screen.

In addition, the user interface 120 may receive diverse user commands including a user command for executing the instant messenger application, a user command for performing various functions in the instant messenger service screen, and so on. For example, the user interface 120 may receive a user command for encrypting a message.

As described above, when the user terminal device 100 is realized as a touch-based portable terminal, the user interface 120 may be realized as a touch screen. However, the user interface 120 may be realized as diverse forms, such as, a remote controller receiver, a mouse, a physical button, a camera, a microphone, and the like, according to an embodiment of the user terminal device 100.

The control unit 130 controls overall operations of the user terminal device 100.

Specially, the control unit 130 may provide a security mode that supports the encryption function with respect to an instant message. That is, the security mode assigns an additional function for the security to the instant messenger service. In this case, the instant messenger operates without change, and the user terminal device 100 may support the additional function for message security autonomously.

To be specific, when the security mode that provides the message encryption function is activated in response to a predetermined event, the control unit 130 encrypts text information inputted in the instant messenger service screen and provides the encrypted text information as an input message of the instant messenger service. When the security mode is inactivated, the control unit 130 provides the inputted text information as an input message of the instant messenger service without encryption. In this embodiment, the input message is the text information, but this is only an example for convenience in explanation. The input message is not limited to the text and may be realized as various inputtable forms including a voice, an image, and the like. The various forms of input message may be encrypted according to the exemplary embodiments, needless to say.

The instant messenger receives the encrypted text as the input message in the security mode and receives a clear text as the input message in a normal mode in which the security mode is inactivated. However, the instant messenger simply transmits the input message, and thus, the functions of the instant messenger are not changed in the security mode.

The control unit 130 may activate the security mode according to a predetermined event before the text information is inputted in a message input box in the instant messenger service screen or according to a predetermined event security after the text information is inputted. In this case, the predetermined event may be an event in which a predetermined item is selected. The predetermined item may be generated in an input interface, generated and displayed on a notification bar, or displayed in the screen as a float-type button.

For example, when an item representing activation of the security mode (for example, a locking shape of a lock or a key shape) is selected after the text information is inputted, the security mode may be activated, but not limited thereto. The security mode may be activated in real time according to various methods including a software button, a hardware button, a voice, a pen input, motion recognition, and so on. In addition, the security mode may be maintained by default while a predetermined setting is maintained.

When the security mode is activated, the control unit 130 may provide diverse forms of feedback, such as, a voice feedback, a haptic feedback, a visual feedback (for example, flicker of a lamp or display of a particular mark), such that a user is able to recognize that the security mode has been activated.

In addition, when the security mode is activated, the control unit 130 may transmit a signal regarding an activation state of the security mode to a corresponding terminal such that a security mode of the corresponding terminal is also activated. In this case, the signal regarding the activation state of the security mode may be transmitted through a messenger or may be transmitted through another communication channel including a Short Message Service (SMS) or a Multimedia Message Service (MMS).

In addition, when the security mode is activated, the control unit 130 may perform encryption with respect to an inputted message by means of various encryption methods. A detailed description on the operation will be provided below with reference to the accompanying drawings.

FIG. 2B is a block diagram illustrating a structure of a user terminal device that receives an instant message according to another exemplary embodiment.

Referring to FIG. 2B, a user terminal device 100' includes a display unit 110', a user interface 120', and a control unit 130'. The basic operations of the display unit 110', the user interface 120', and the control unit 130' are the same as the operations of the components illustrated in FIG. 2A, and thus, a detailed description on the operations is omitted. Hereinafter, only an operation of receiving an instant message will be described.

The display unit 110' provides an instant messenger service screen including an output message. In this case, the output message is a message received through the instant messenger service and refers to a message to be provided to a user of the user terminal device 100'.

To be specific, when an instant messenger application is operated automatically in response to a message being received or a corresponding application is executed according to a user command, the display unit 110' may provide the service screen including the received message.

The user interface 120' receives diverse user commands.

Specially, the user interface 120' may receive diverse user commands, such as, a user command for executing the instant messenger application, a user command for performing various functions in the service screen, and the like. For example, when an encrypted message is received, the user interface 120' may receive a user command for decrypting the message.

The control unit 130' controls overall operations of the user terminal device 100'.

Specially, when the output message included in the instant messenger service screen is an encrypted message, the control unit 130' may decrypt the encrypted message according to a predetermined event and provide the decrypted message in the instant messenger service screen as a replacement of the encrypted message or provide the decrypted message along with the encrypted message, or provide the decrypted message in another screen separate from the instant messenger service screen. In this case, the received encrypted message may be a message in which the inputted text information has been encrypted while the security mode of the corresponding terminal is activated. The predetermined event may be at least one of an event in which a message is received, an event in which a display state of the service screen is changed, an event in which an area where the encrypted message is displayed is selected, and an event in which a predefined menu item is selected.

To be specific, when the instant message is received, the control unit 130' may automatically determine whether the received message is an encrypted message, without any event. When it is determined that the received message is an encrypted message, the control unit 130' may decrypt and provide the message. In addition, when the instant message is received and a touch event on an area where the received message is displayed is present, the control unit 130' may determine whether the received message is an encrypted message. When it is determined that the received message is an encrypted message, the control unit 130' may decrypt and provide the message. In addition, when the instant message is received and a predetermined menu button for decrypting a message is selected, the control unit 130' may decrypt and provide the message.

The control unit 130' may provide the decrypted message in at least one form of an opaque On Screen Display (OSD) form, a transparent OSD form, and a window form different from a window where the instant messenger service screen is displayed. For example, the control unit 130' may overlay an opaque OSD screen or a transparent OSD screen on at least one area of the instant messenger service screen while maintaining a size of the instant messenger service screen to provide the decrypted message. In addition, the control unit 130' may provide the decrypted message in a form of a simple pop-up window or a toast pop-up window. In addition, the control unit 130' may provide the decrypted message to a message window of the instant messenger as a replacement of the encrypted message. In addition, the control unit 130' may change a mode to a multi-window mode automatically, provide the instant messenger service screen in a window of which size has been adjusted, and provide the decrypted message in another window on the other area than the area where the window is provided. For example, the control unit 130' may provide a multi-window based on at least one template that defines a layout for arranging the multi-window in the screen. A detailed description on the operation will be provided below with reference to the accompanying drawings.

The control unit 130' may provide the decrypted message by varying a color of a message box that provides the decrypted message or a color of text included in the decrypted message differently from the conventional instant messenger. As an example, when a message box of the conventional instant messenger is white, the control unit 130' may provide a message box including the decrypted message in a color different from white, for example, pink. In this case, the message box refers to a word balloon-shaped GUI for displaying a message in the conventional instant messenger. As another example, when the conventional instant messenger provides text in black, the decrypted message may be provided in a color different from white, for example, blue. The color may be set by default of may be changed by a user setting. The aforementioned colors are only an example for convenience in explanation, which may be clearly understood by a person having ordinary skill in the art (hereinafter referred to as 'those skilled in the art').

Meanwhile, the control unit 130' may extract text information included in the encrypted message, that is, encrypted text, in various methods, before or after the encrypted message is outputted.

To be specific, when the instant messenger application supports an Application Program Interface (API) that provides information on a received message, the control unit 130' may decrypt the acquired text information through the API.

That is, when the instant messenger application supports the API that directly provides the text information on the received message to an O/S of a terminal or to another application, the control unit 130' may acquire the text information easily.

When the instant messenger application does not support the API that provides the information on the received message, the control unit 130' may extract the text information, that is, the encrypted text, from a framework or from an OS layer.

To be specific, the control unit 130' may acquire the text information in a view through at least one of analysis of a drawing system for outputting an output message in the display unit 110' and Optical Character Recognition (OCR) analysis on a captured image of the instant messenger service screen. In this case, the drawing system for outputting an output message in the screen may be a "view system" of Android platform, for example.

To be specific, when the user terminal device 100' includes a software platform capable of providing the text information on a view in the screen (for example, Android platform), the control unit 130' may acquire the text in the view through the platform. For example, Android platform consisting of an operation system, middleware, and an application for a mobile phone may be an example, but any type of platform may be applied if the platform provides a corresponding function.

The control unit 130' may capture the instant messenger service screen and perform the OCR analysis on the captured screen to acquire the text information included in the received encrypted message.

Meanwhile, other various methods for acquiring text information from a received message may be used to extract text, on top of the above-described method.

In order to determine whether a message is an encrypted message or a normal message, identification information for identifying an encrypted message may be included in the encrypted message. In this case, an encryption extracting module may identify the encrypted message based on the information. In addition, the encryption extracting module may be realized so as to distinguish the normal message and the encrypted message by transmitting a message for identifying the encrypted message.

The control unit 130' may decrypt the encrypted text acquired according to the above-described various methods, by means of various decryption methods.

To be specific, various encryption methods may include an encryption method using a symmetric key (secret key) (for example, a block cipher including DES, AES, SEED, HIGHT, a stream cipher, and so on), an encryption method using an asymmetric key (public key) (for example, RSA, ElGamal, ECC, and so on), an encryption method using a hash function (for example, SHA, HAS-160), and thus like.

As an example, when the user terminal device 100' receiving an instant message pre-stores a public key and a private key, and the user terminal device 100 transmitting a message pre-stores the public key of the user terminal device 100', the user terminal device 100' may decrypt an encrypted message which was encrypted and transmitted by the user terminal device 100 by using the public key, by means of the private key. In this case, the public key may be exchanged between the user terminal device 100 and the user terminal device 100' when a predetermined event occurs. For example, the public key may be exchanged in various cases where a predetermined menu is selected or a contact list supported by the instant messenger is exchanged, for example.

As another example, the encryption and decryption may be performed through an external encryption management server (not shown). In this case, the encryption management server (not shown) may be realized as a cloud server operated by a device manufacturer, for example, but not limited thereto.

When the encryption management server (not shown) manages the public key and the private key, the private key may assigned to the user terminal device 100' receiving a message, and the public key corresponding to the private key assigned to the user terminal device 100 may be assigned to the user terminal device 100' according to a request of the user terminal device 100 transmitting a message. Consequently, the user terminal device 100 may decrypt the message which was encrypted through the public key, by using the corresponding private key. Accordingly, an arbitrary private key may be generated and provided at every session.

As another example, a message may be encrypted by generating an arbitrary secret key at every session, and a session key may be encrypted and transmitted by using the public key. Accordingly, the message may be encrypted and transmitted by using the arbitrary secret key at every session.

As still another example, various methods, such as, a Diffie-Hellman method, a RSA key exchange method, and an Elliptical Curve Cryptography (ECC) method, may be used.

In the above embodiment, the user terminal device 100 transmitting an instant message was described with reference to FIG. 2A, and a user terminal device 100' receiving an instant message was described with reference to FIG. 2B, which is for the convenience in explanation. The functions of the user terminal device 100 transmitting an instant message and the functions of the user terminal device 100' receiving an instant message may be performed by one user terminal device, which may be clearly understood by those skilled in the art.

Figure 2C:
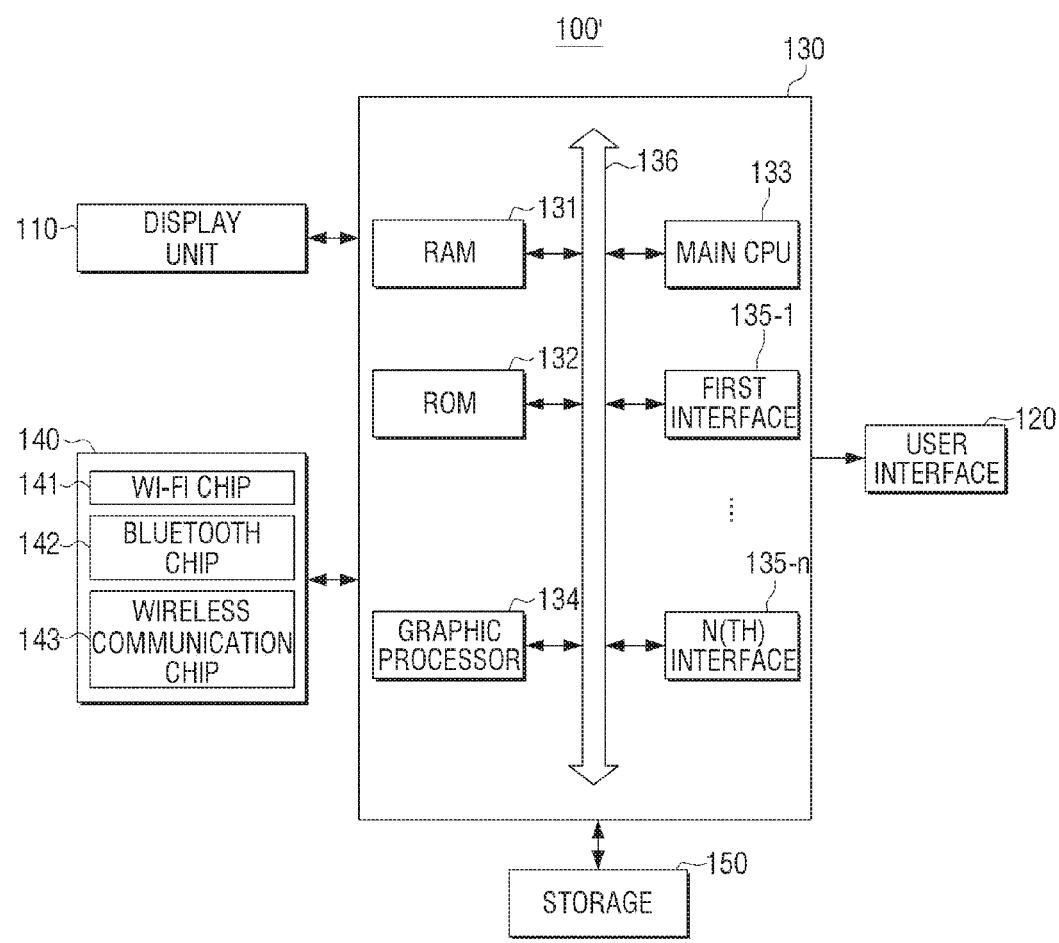

FIG. 2C is a block diagram illustrating a detailed structure of the user terminal device of FIG. 2B, according to an exemplary embodiment. The user terminal device of FIG. 2A may also have the detailed structure of the user terminal device of FIG. 2C.

Referring to FIG. 2C, the user terminal device 100 includes the display unit 110, the user interface 120, the control unit 130, a storage' 150, a communication unit 140, and an application driving unit (not shown). A detailed description on the components of FIG. 2C which are overlap with the components of FIG. 2B is omitted.

The control unit 130 controls overall operations of the user terminal device 100 by using various programs stored in the storage 140.

For example, the control unit 130 may execute an application stored in the storage 140, configure an execution screen of the application, and display the execution screen. The control unit 130 may reproduce diverse contents stored in the storage 140. In addition, the control unit 130 may communicate with external devices through the communication unit 150.

To be specific, the control unit 130 includes a Random Access Memory (RAM) 131, a Read-Only Memory (ROM) 132, a main Central Processing Unit (CPU) 133, a graphic processor 134, first to n(th) interfaces 135-1 to 135-n, and a bus 136.

The RAM 131, the ROM 132, the main CPU 133, the graphic processor 134, and the first to n(th) interfaces 135-1 to 135-n may be interconnected through the bus 136.

The first to n(th) interfaces 135-1 to 135-n are connected to the aforementioned various components. One of the interfaces may be a network interface which is connected to an external apparatus through a network.

The main CPU 133 accesses the storage 150 and performs a boot-up operation by using an O/S stored in the storage 150. In addition, the main CPU 133 performs various operations by using diverse programs, contents, and data stored in the storage 150.

The ROM 132 stores a set of commands for system booting. When a turn-on command being received and power being supplied, the main CPU 133 copies the O/S stored in the storage 150 to the RAM 131 according to a command stored in the ROM 132, and boots up a system by executing the O/S. Upon completion of the boot-up operation, the main CPU 133 copies various application programs stored in the storage 140' to the RAM 131 and executes the application programs copied to the RAM 131 to perform various operations.

The graphic processor 134 generates a screen including various objects, such as, an icon, an image, text, and so on, by using a computing unit (not shown) and a rendering unit (not shown). The computing unit computes attribute values, such as, a coordinate value, a shape, a size, and a color of each object, according to a layout of the screen based on the received control command received from the graphic processor 134. The rendering unit generates a screen with various layouts including objects based on the attribute values computed by the computing unit. The screen generated by the rendering unit is displayed in a display area of the display unit 110.

The above-described operations of the control unit 130 may be performed by the programs stored in the storage 140. The storage 150 may store diverse data, such as, an O/S software module for driving the user terminal device 100, various applications, various contents inputted or set during execution of an application, and so on. Specially, the storage 150 may store an application for providing the instant messenger service according to an exemplary embodiment and an encryption module for supporting an encryption service in the security mode.

The other various software modules stored in the storage 150 will be described below with reference to FIGS. 3A to 3C.

Figure 3A:
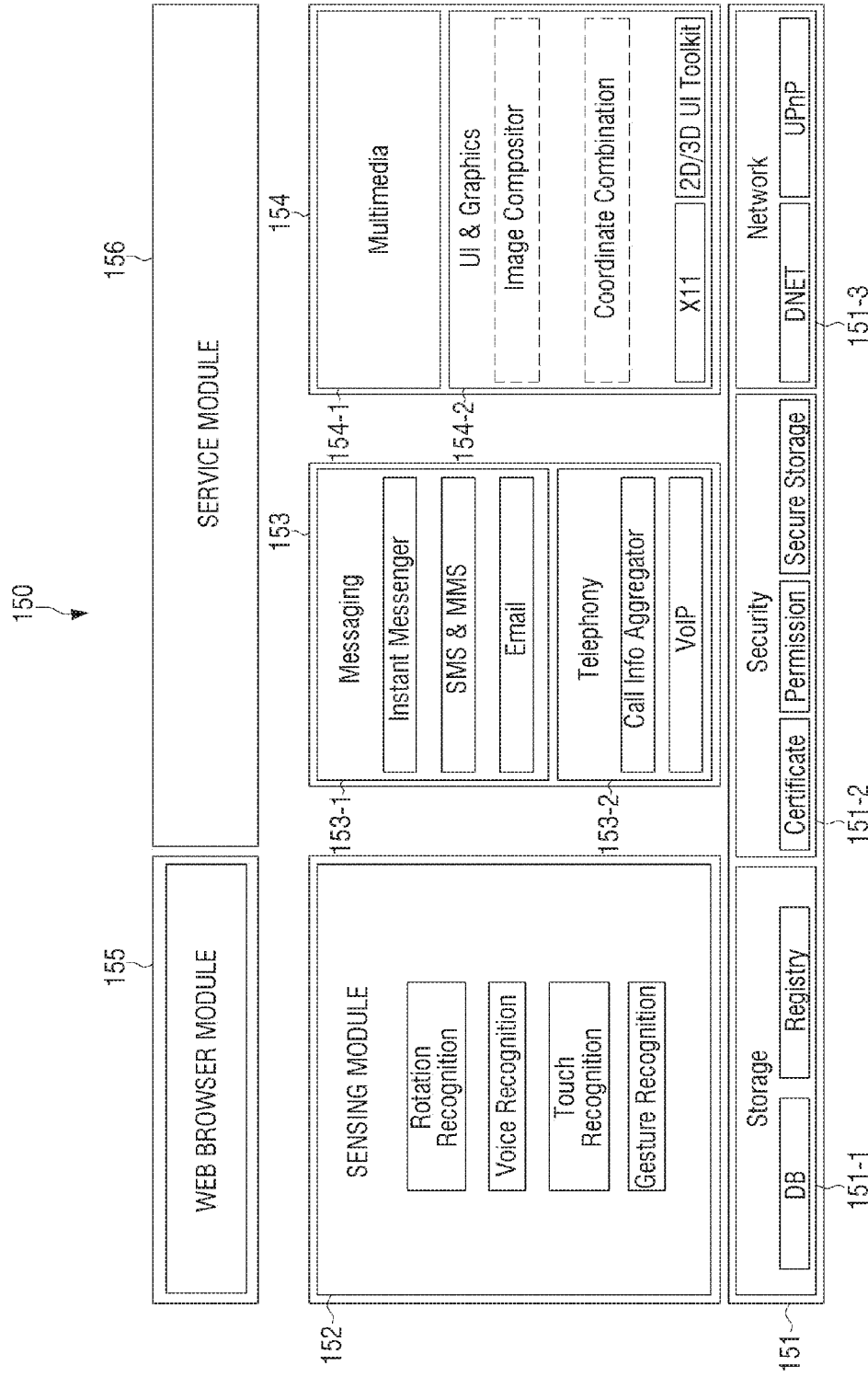
FIG. 3 is a block diagram illustrating a configuration of diverse software modules stored in a storage.

Referring to FIG. 3A, the storage 150 may include software including a base module 151, a sensing module 152, a communication module 153, a presentation module 154, a web browser module 155, and a service module 156.

The base module 151 refers to a basic module that processes signals transmitted from respective hardware included in the user terminal device 100 and transmits the processed signals to an upper layer module. The base module 151 includes a storage module 151-1, a security module 151-2, and a network module 151-3. The storage module 151-1 refers to a program module for managing a database (DB) or registry. The main CPU 133 may access the DB in the storage 140 by using the storage module 151-1 and read diverse data. The security module 151-2 refers to a program module for supporting certification, permission, and secure storage with respect to the hardware. The network module 151-3 refers to a module for supporting network connection and includes a DNET module, a UPnP module, and the like. Specially, the security module 151-2 may store a program for supporting the encryption function according to the embodiment.

The sensing module 152 collects information from various sensors and analyzes and manages the collected information. The sensing module 152 may include a face recognition module, a voice recognition module, a motion recognition module, a Near Field Communication (NFC) recognition module, and the like.

The communication module 153 performs communication with an external apparatus. The communication module 153 may include a messaging module 153-1 including a messenger program, a Short Message Service (SMS) & Multimedia Message Service (MMS) program, and an e-mail program, a call info aggregator program module, and a phone module 153-2 including a VoIP module.

The presentation module 154 configures a display screen. The presentation module 154 includes a multimedia module 154-1 for reproducing and outputting a multimedia content and a UI rendering module 154-2 for performing a UI processing operation and graphic processing operation. The multimedia module 154-1 may include a player module, a camcorder module, a sound processing module, and the like. Accordingly, the multimedia module 154-1 reproduces diverse multimedia contents to generate and reproduce a screen and audio. The UI rendering module 154-2 may include an image compositor module that composes an image, a coordinate compositor module that composes generates a coordinate to display an image, an X11 module that receives various events from the hardware, a two-dimensional (2D)/three-dimensional (3D) UI toolkit that provides a tool for configuring a 2D UI or 3D UI, and so on.

The web browser module 155 refers to a module that performs a web browsing operation to access a web server. The web browser module 155 may include various modules, such as, a web view module that configures a web page, a download agent module that performs a download operation, a bookmark module, a Webkit module, and the like.

The service module 156 includes diverse applications for providing various services. To be specific, the service module 156 may include various program modules, such as, a navigation program, a content reproducing program, a game program, an electronic book (e-book) program, a calendar program, an alarm management program, and other widgets.

FIG. 3A illustrates various program modules, but the program modules may be omitted, modified, or added according to a type or characteristic of the user terminal device 100, needless to say. For example, the program module may further include a location-based module that supports a location-based service by operating with hardware, such as, a Global Positioning System (GPS) chip.

Figure 3B:
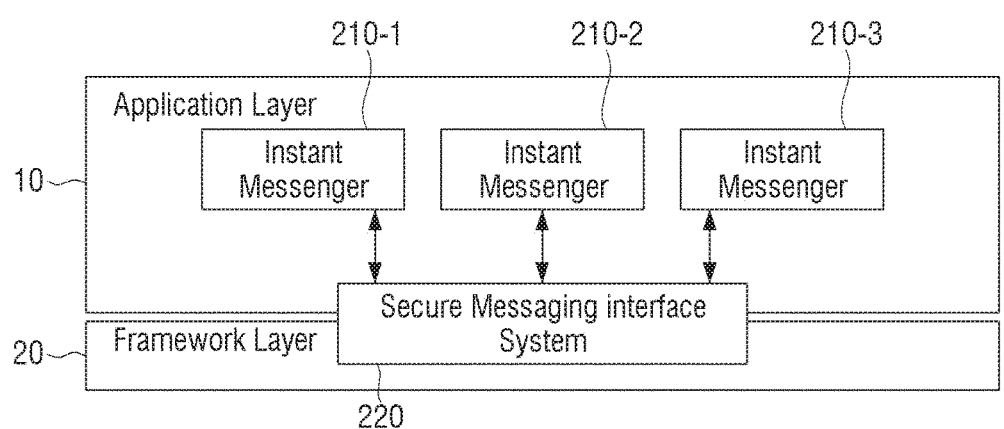

FIG. 3B is a diagram provided to describe a relation between a messenger module and a security module for better understanding of the exemplary embodiment.

According to an exemplary embodiment, as illustrated in FIG. 3B, an application layer 10 of the user terminal device 100' may include diverse instant messenger modules 210-1 to 210-3, and a framework layer 20 of the user terminal device 100' may include a security module, that is, a secure messaging interface system 220. That is, unlike the conventional instant messenger modules that include a security function respectively, the security function for various messengers may be provided through the common security module included in the framework layer 20, that is, the secure messaging interface system 220.

Figure 3C:
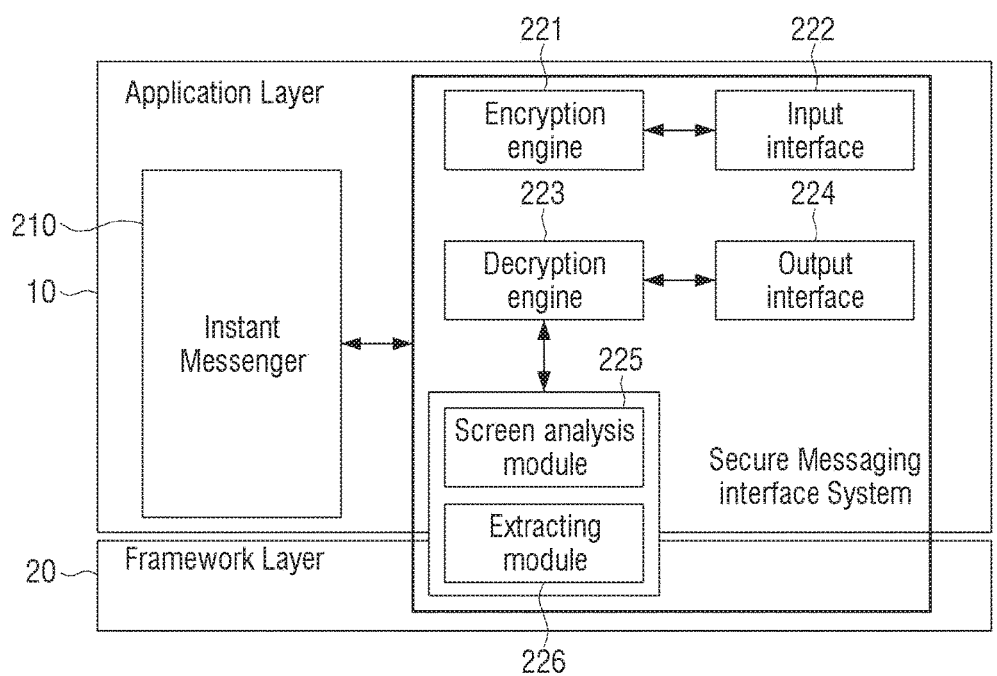

FIG. 3C is a diagram illustrating a detailed structure of the security module of FIG. 3B.

Referring to FIG. 3B, the secure messaging interface system 220 included in the framework layer 20 includes an Encryption engine 221, an Input interface 222, a Decryption engine 223, an Output interface 224, a Screen analysis module 225, and an Extracting module 226.

Hereinafter, a brief description on the operations of the secure messaging interface system 220 is provided. For convenience in explanation, functions of a terminal transmitting an instant message and functions of a terminal receiving an instant message will be described comprehensively.

The terminal transmitting an instant message inputs text information in the instant messenger service screen through the Input interface 222. The inputted text information is hooked in the O/S or in the framework by a message extracting module (not shown) and transmitted to the Encryption engine 221. The Encryption engine 221 may encrypt the transmitted message and transmit the encrypted message to the instant messenger module 210.

When the instant message is received through the instant messenger module 210, the terminal receiving an instant message extracts the encrypted text through the Screen analysis module 225 and the Extracting module 226 and transmits the extracted encrypted text to the Decryption engine 223. The Decryption engine 223 may decrypt the transmitted message. In this case, the Screen analysis module 225 and the Extracting module 226 for extracting the encrypted text are not necessarily realized in the framework layer 20 and may be present in the OS layer or in the application layer 10. To be specific, when the API for providing an external application with the message received through the instant messenger module 210 is supported, the encrypted text may be extracted through the API. However, when the API is not supported, the text information, that is, the encrypted text may be extracted from the framework layer, OS layer, or application layer.

Referring back to FIG. 2C, the communication unit 140 communicates with various types of external apparatus according to a variety of communication methods. The communication unit 140 may include a Wireless Fidelity (Wi-Fi) chip 141, a Bluetooth chip 142, a wireless communication chip 143, and so on.

The Wi-Fi chip 141 and the Bluetooth chip 142 perform communication according to a Wi-Fi method and a Bluetooth method, respectively. The wireless communication chip 143 refers to a chip that performs communication according to various communication standards including Institute of Electrical and Electronics Engineers (IEEE), Zigbee, 3rd Generation (3G), 3rd Generation Partnership Project (3GPP), Long Term Evolution (LTE), and so on. The communication unit 140 may further include a NFC chip that operates according to an NFC method using 13.56 MHz band among various Radio Frequency-Identification (RF-ID) frequency bands including 135 kHz, 13.56 MHz, 433 MHz, 860 to 960 MHz, 2.45 GHz, and so on.

The communication unit 140 may communicate with at least one of an instant messenger providing server (not shown) and the encryption management server (not shown). In this case, the communication with respect to each of the servers may be performed in the same communication methods or may be performed in different communication methods, according to the needs. For example, the communication unit 140 may perform the communication through the wireless communication chip 143.

The application driving unit drives and executes an application that may be provided by the user terminal device 100. In this case, the application refers to an application that may be executed autonomously. The application may include diverse multimedia contents. A term 'multimedia content' may include text, audio, a still image, an animation, video, an interactivity content, an Electronic Program Guide (EPG) content from a content provider, an electronic message received from users, information on a present event, and so on, but not limited thereto.

The user terminal device 100' may further include an audio processor, a video processor, a speaker, a button, a Universal Serial Bus (USB) port, a camera, a microphone, and the like. For example, the user terminal device 100' may operate in a motion control mode or in a voice control mode by means of the camera or the microphone.

Hereinafter, various exemplary embodiments will be described with reference to the accompanying drawings, based on the assumption that the inputted information is text information, and the user terminal device 100 is a touch-based portable terminal, for convenience in explanation.

Figure 4A:
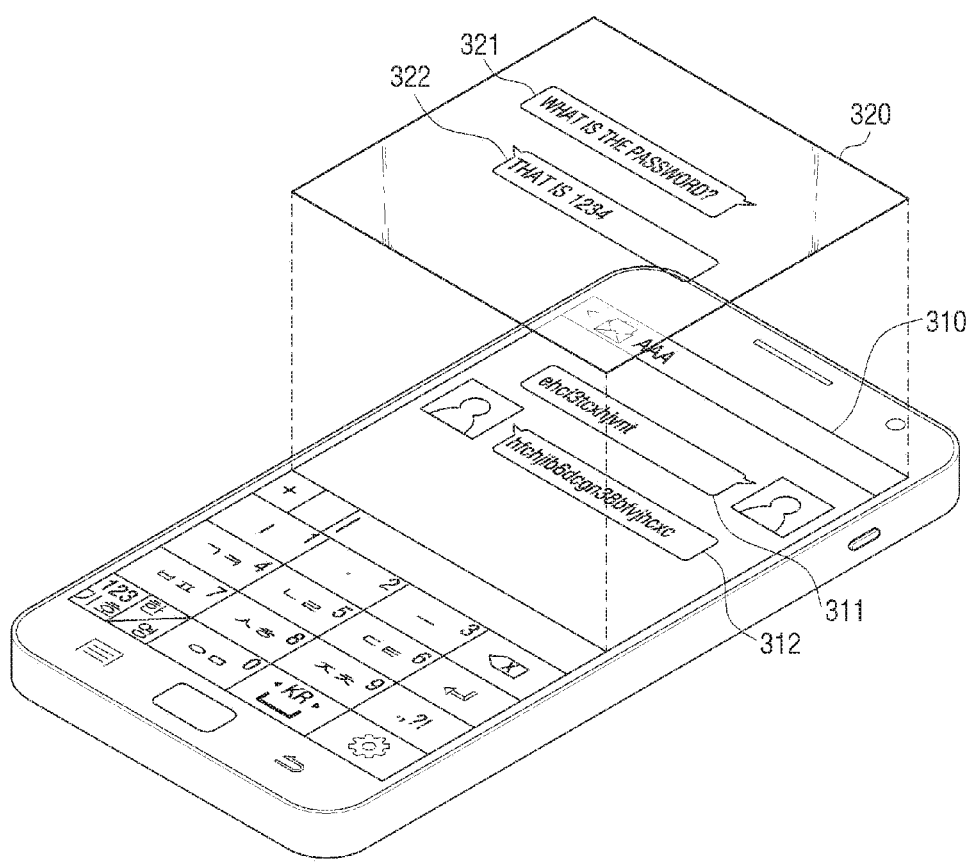
FIGS. 4A, 4B, 4C, and 4D are diagrams provided to describe a method for providing a decrypted message according to various exemplary embodiments.
Figure 4B:
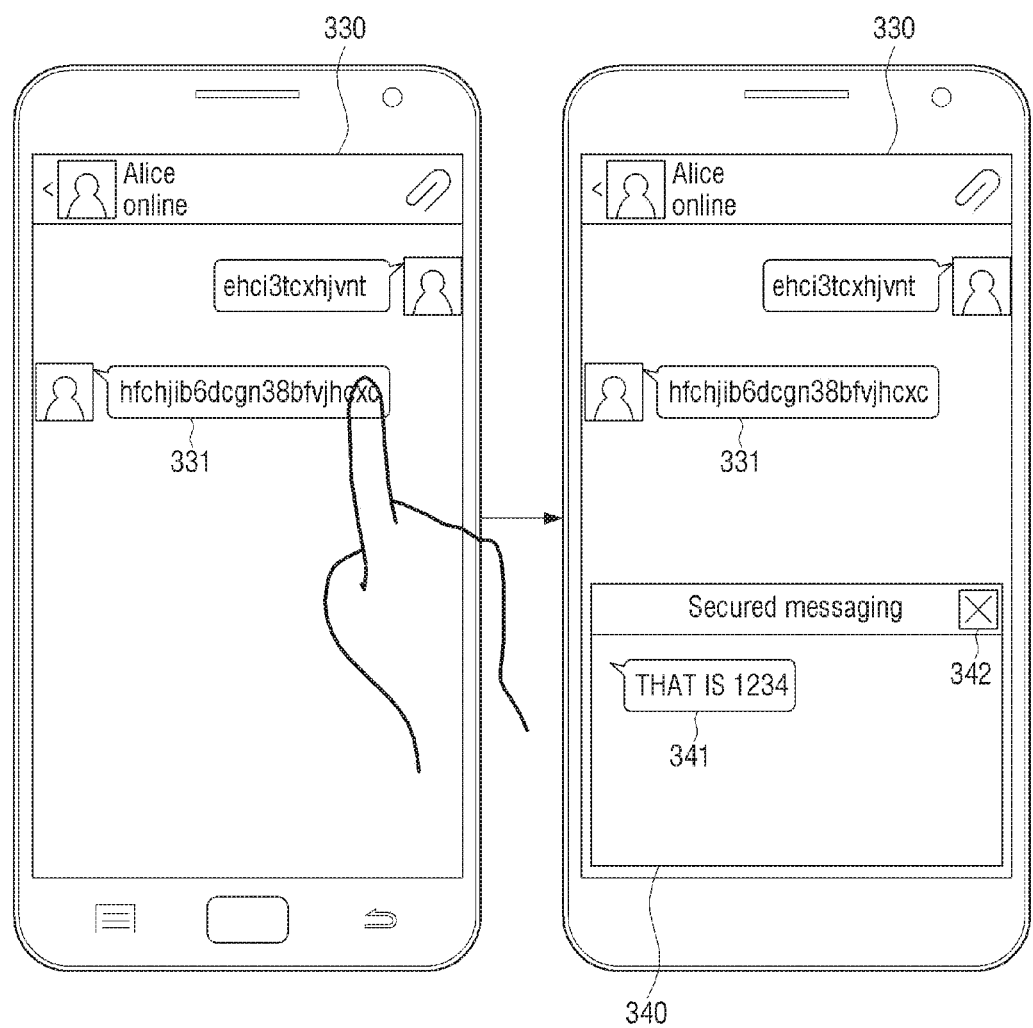
Figure 4C:
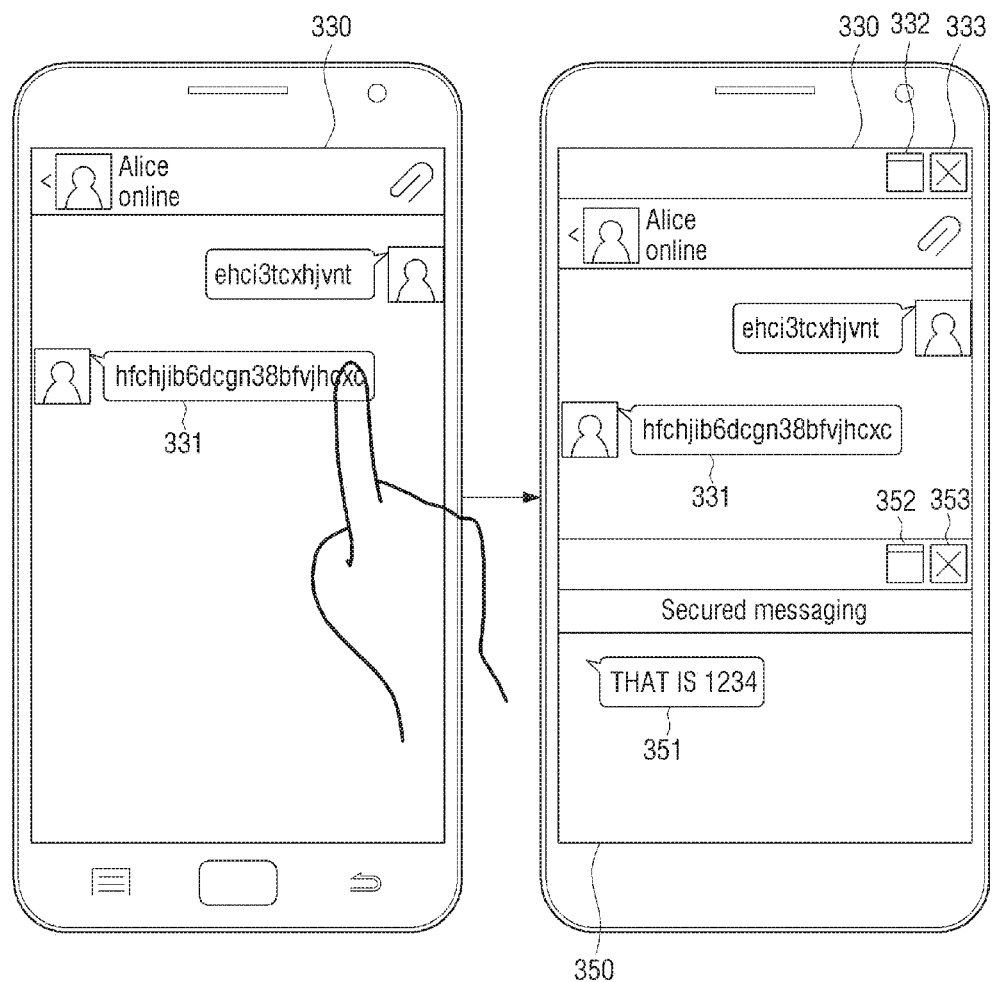

FIGS. 4A to 4C are diagrams provided to describe a method for providing a decrypted message according to various exemplary embodiments.

As illustrated in FIG. 4A, a decrypted message may be provided in a transparent OSD screen 320 overlaid on a messenger screen 310.

For example, as illustrated, when a predetermined event, such as, an event in which an area 312 or an area 311 where the encrypted text received from the messenger screen 310 is displayed is selected (for example, a touch) or an event in which a predetermined button is inputted, occurs, the encrypted text may be displayed in the transparent OSD screen 320 where a decrypted clear text 322 is overlaid on the messenger screen 310. FIG. 4A illustrates that an input message 321 is displayed in the transparent OSD screen 320, but this is only an example. That is, the transparent OSD screen 320 may display only the clear text 322 that the received encrypted text has been decrypted. In addition, the decrypted clear text may be displayed in a messenger screen that is not an OSD form.

As illustrated in FIG. 4B, the decrypted message may be displayed in an opaque OSD screen 340 overlaid on a messenger screen 330.

For example, as illustrated, when the event in which an area 331 where the encrypted text received from the messenger screen 330 is displayed is selected (for example, a touch event) occurs, the opaque OSD window 340 may be displayed in a part of area of the messenger screen 330, and a clear text 341 where the received encrypted text has been decrypted may be provided in the OSD window 340. In this case, the opaque OSD screen 340 may include a menu button 342 for receiving a window closing command for removing the opaque OSD screen 340 from the screen.

In addition, as illustrated in FIG. 4C, the decrypted message 351 may be provided in a window 350 displayed in another area separate from the messenger screen 330.

For example, as illustrated, when the event in which the area 331 where the encrypted text received from the messenger screen 330 is displayed is selected (for example, a touch event) occurs, a mode may be changed to the multi-window mode automatically. That is, as illustrated, the window 330 that provides the messenger screen in the multi-window mode may be changed to have a small size that occupies a part of area of the entire screen area so as to be moved and enlarged or reduced easily. A window where the decrypted message is provided may be provided so as not to be overlaid on an area where the window 330 is not displayed. Accordingly, a title area of the window 330 that provides the messenger screen and a title area of the window 350 that provides the decrypted message may include buttons 332, 333, 352, 353 for receiving a window maximizing command and the window closing command, respectively. In this case, the title area may be an area including a menu item for providing functions of moving, resizing, or pinning up an application window provided in the multi-window mode.

Figure 4D:
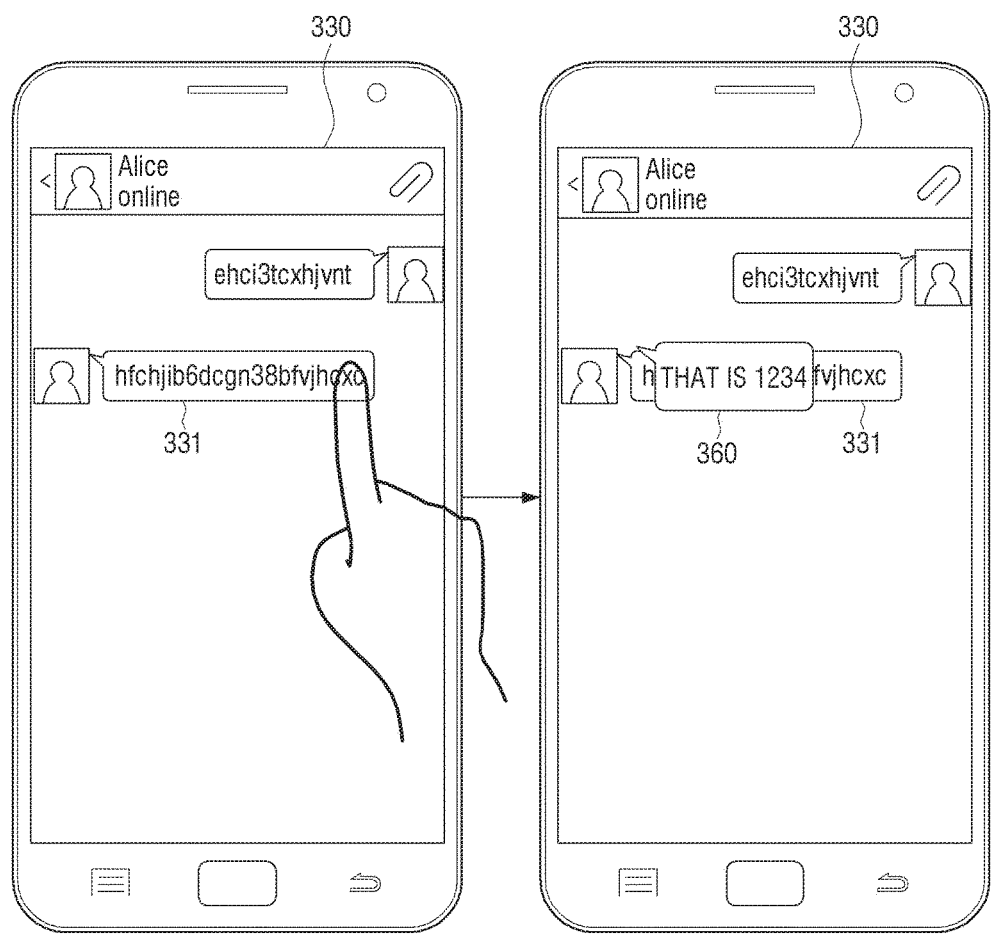

As illustrated in FIG. 4D, the decrypted message may be overlaid and displayed on the area where the encrypted text is displayed in the messenger screen 330.

For example, as illustrated, when the event in which the area 331 where the encrypted text received from the messenger screen 330 is displayed is selected (for example, a touch event) occurs, the decrypted message may be provided in a form of a message 360 overlaid in the area 331 where the encrypted text is displayed.

Figure 5A:
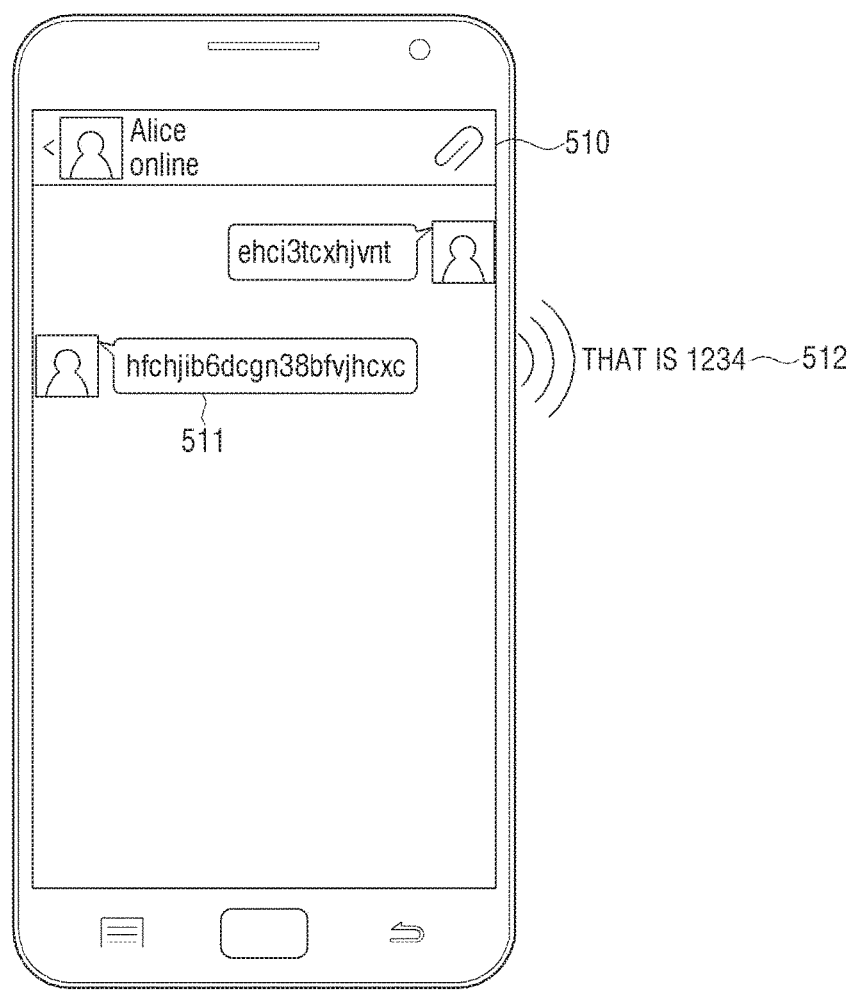
FIGS. 5A and 5B are diagrams provided to describe a method for providing a decrypted message according to another exemplary embodiment.
Figure 5B:
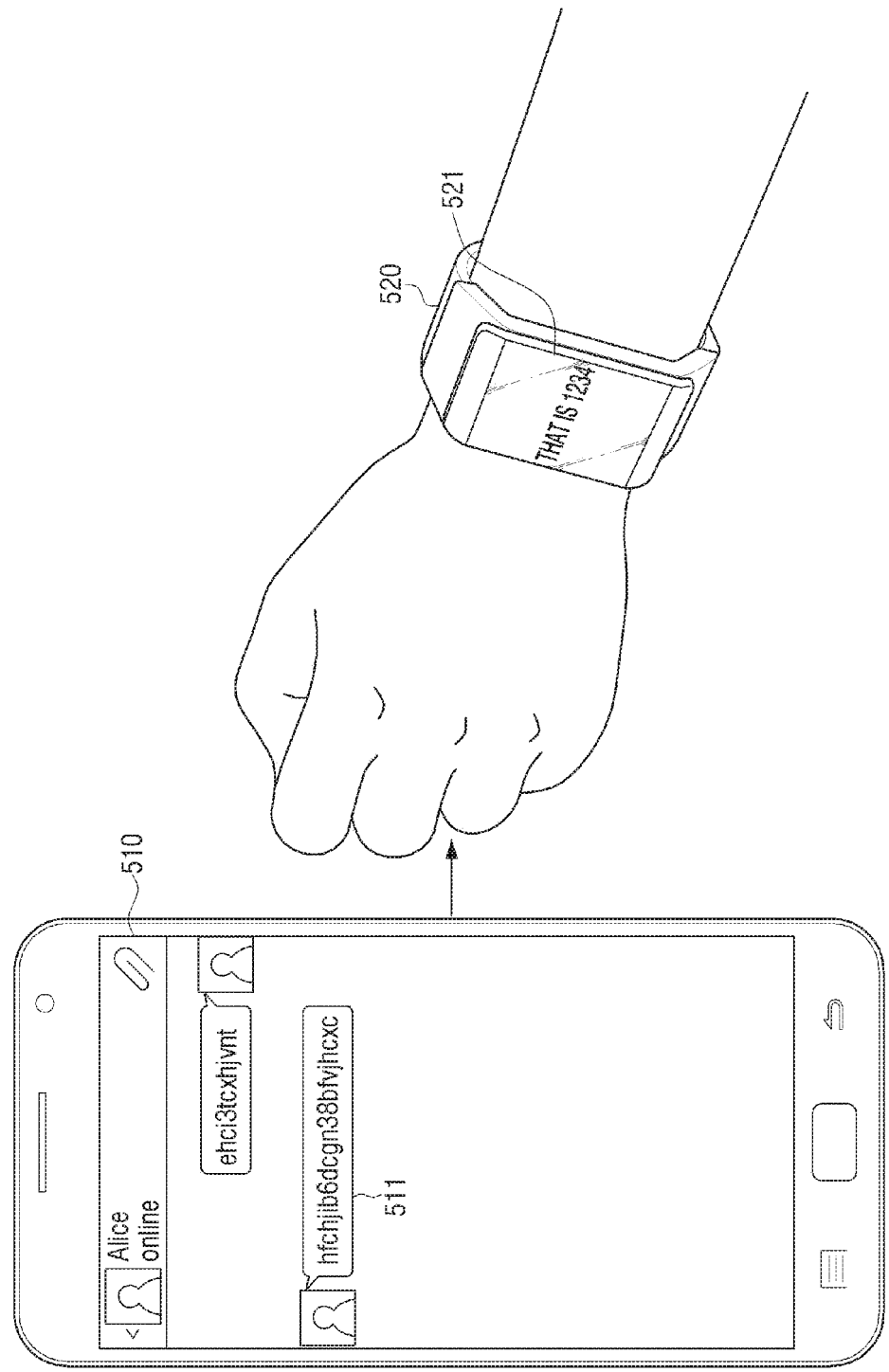

FIGS. 5A and 5B are diagrams provided to describe a method for providing a decrypted message according to another exemplary embodiment.

As illustrated in FIG. 5A, encrypted message 511 from contact 510 may be converted to a decrypted message which may be provided in a form of a voice message 512 or provided through a device 520 as illustrated in FIG. 5B.

For example, as illustrated in FIG. 5A, the decrypted message may be provided in a form of a voice through a speaker according to a Text to Speech (TTS) method or provided through a screen 521 of the wearable device 520 that communicates with the user terminal device 100, as illustrated in FIG. 5B.

In addition, according to another exemplary embodiment, the user terminal device determines whether the received encrypted text is an encrypted text, automatically. When it is determined that the received text is an encrypted text, a decrypted clear text is displayed in the screen of the instant messenger as a replacement of the encrypted text. In this case, the decrypted clear text is displayed automatically without a user interaction (input). When the security mode is activated by a manipulation of a predetermined button or by an input, the received encrypted text is displayed as the decrypted clear text, and when the security mode is inactivated, the received encrypted text is displayed as the encrypted text is displayed.

Figure 6A:
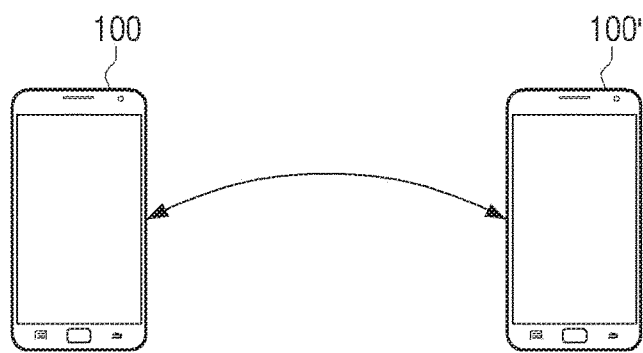
FIGS. 6A and 6B are diagrams provided to describe an encryption method according to various exemplary embodiments.
Figure 6B:
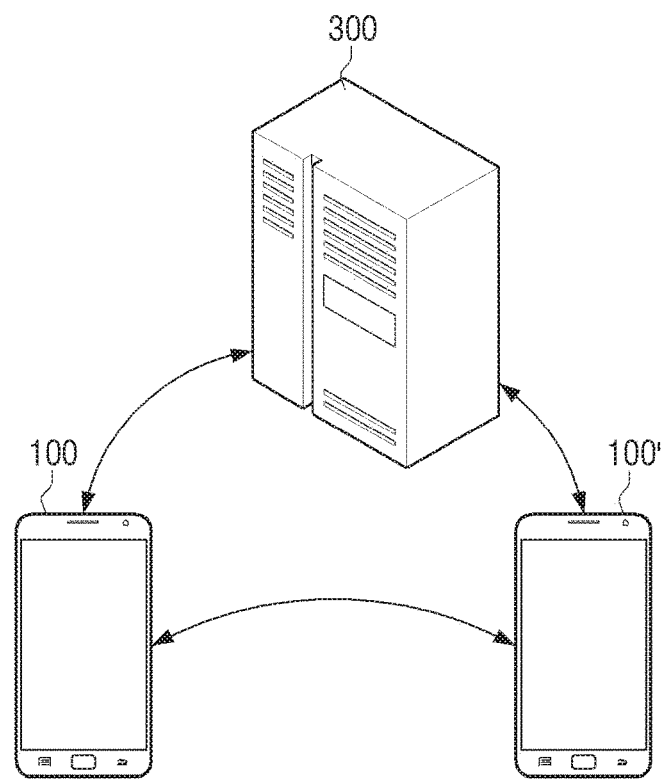

FIGS. 6A and 6B are diagrams provided to describe an encryption method according to various exemplary embodiments.

According to an exemplary embodiment, as illustrated in FIG. 6A, the encryption and decryption may be performed directly through the key exchange between the transmitting terminal 100 that transmits an encrypted message through the instant messenger and the receiving terminal 100' that receives the encrypted message. For example, the key exchange may be performed in a Peer-to-peer (P2P) method through the mobile communication (3G/LTE/5G), Bluetooth, Wi-Fi (including Wi-Fi Direct), and so on.

To be specific, when the receiving terminal 100' that receives the encrypted message pre-stores a public key and a private key, and the transmitting terminal 100 that transmits the encrypted message pre-stores the public key of the receiving terminal 100', the receiving terminal 100' may decrypt the encrypted message which was encrypted and transmitted by the transmitting terminal 100 by using the public key, by means of the private key. In this case, the public key may be exchanged between the transmitting terminal 100 and the receiving terminal 100' when a predetermined event occurs. For example, the public key may be exchanged in various cases where a predetermined menu is selected or a contact list supported by the instant messenger is exchanged.

According to another exemplary embodiment, the encryption and decryption may be performed through an external encryption management server 300. In this case, the encryption management server 300 may be realized as a cloud server operated by a device manufacturer, for example, but not limited thereto.

When the encryption management server 300 manages the public key and/or the private key, the private key may be assigned to the receiving terminal 100' that receives the encrypted message, and the public key corresponding to the private key assigned to the receiving terminal 100' may be assigned to transmitting terminal 100 according to a request of transmitting terminal 100 that transmits a message. Consequently, the receiving terminal 100' may decrypt the message encrypted by using the public key of the transmitting terminal 100, by means of the corresponding private key. Accordingly, an arbitrary private key may be generated and provided at every session.

The above-described encryption method and decryption method are only an example, and other various encryption methods and decryption methods may be used, needless to say. For example, the key exchange may be performed in the P2P method by receiving at least one of an encryption key and the public key from a key management server.

Figure 7:
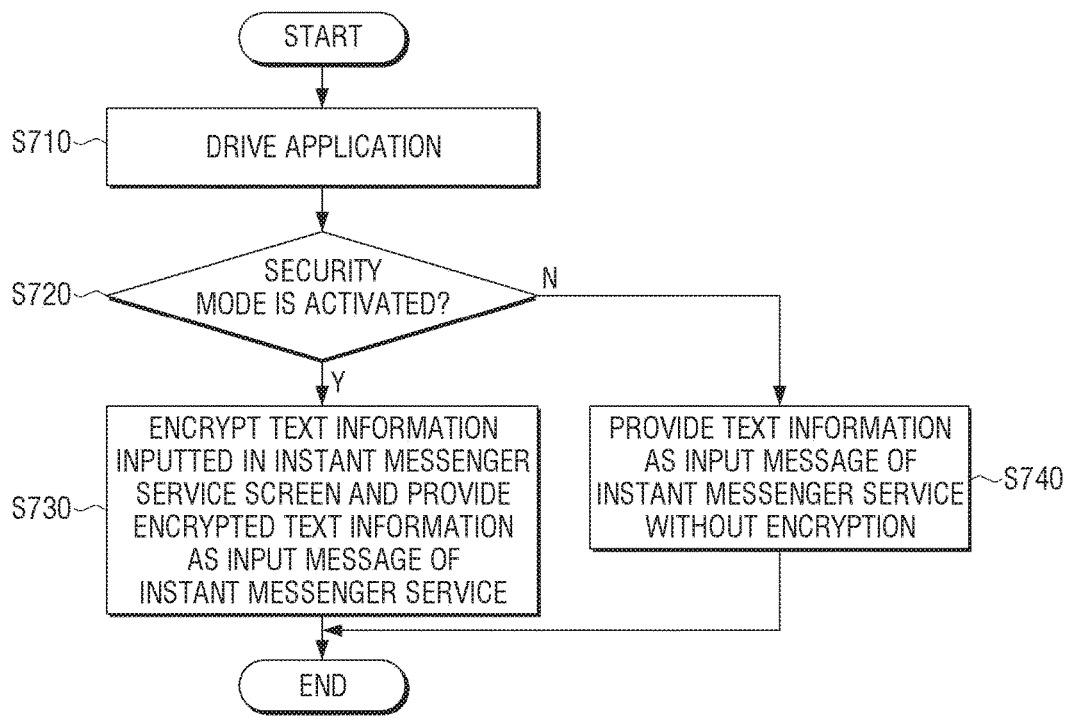
FIG. 7 is a flowchart provided to describe a method for controlling a user terminal device according to an exemplary embodiment.

FIG. 7 is a flowchart provided to describe a method for controlling a user terminal device according to an exemplary embodiment.

FIG. 7 descries a method for controlling a user terminal that transmits an instant message according to an exemplary embodiment. Referring to FIG. 7, an instant messenger application is operated (S710).

When the security mode is activated (S720:Y), text information inputted in an instant messenger service screen is encrypted and provided as an input message of the instant messenger service (S730).

When the security mode is not activated (S720:N), the text information inputted in the instant messenger service screen is provided as an input message of the instant messenger service without encryption (S740).

In this case, the security mode may be activated according to a predetermined event before the text information is inputted in a message input box in the screen or may be activated according to a predetermined event after the text information is inputted. In this case, the predetermined event may be an event in which a predetermined item, such as, a lock button, is selected.

Figure 8:
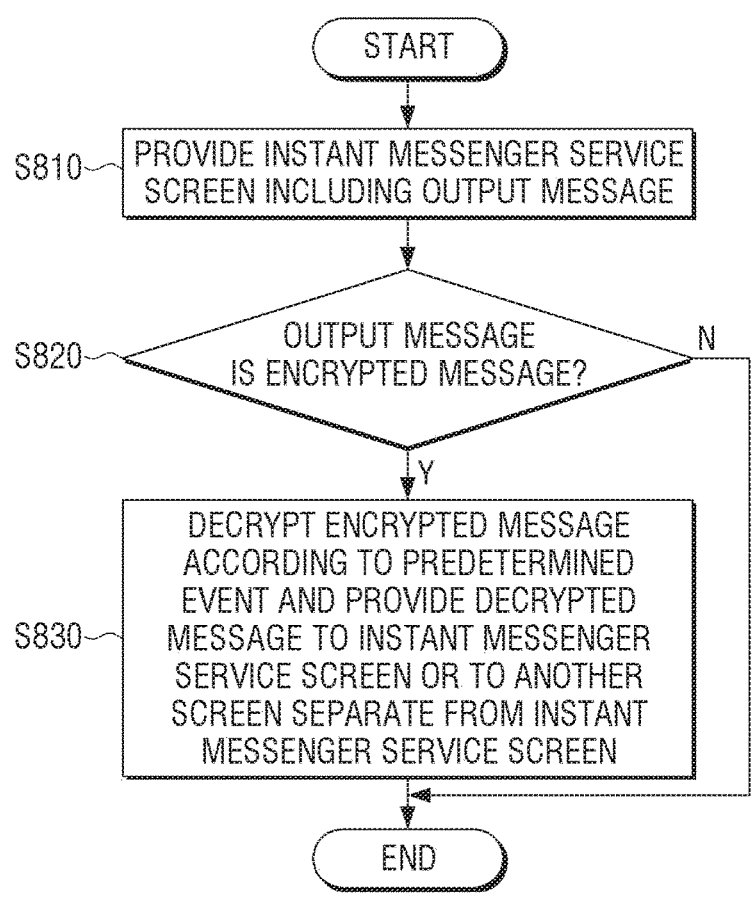
FIG. 8 is a flowchart provided to describe a method for controlling a user terminal device according to another exemplary embodiment.

FIG. 8 is a flowchart provided to describe a method for controlling a user terminal device according to another exemplary embodiment.

FIG. 8 descries a method for controlling a user terminal that receives an instant message according to another exemplary embodiment. When an instant message is received, an instant messenger service screen including an output message corresponding to the received message is provided (S810:N). In this case, the instant messenger service screen may be provided according to various events, for example, an event in which a message is received, an event in which a user command for driving an application is received, and so on.

Subsequently, when the output message is an encrypted message (S820:Y), the encrypted message is decrypted according to a predetermined event, and the decrypted message is provided to the instant messenger service screen or to another screen separate from the instant messenger service screen (S830). In this case, the predetermined event may be at least one of an event in which an encrypted message is received, an event in which an area where the encrypted message is displayed is selected, and an event in which a predefined menu item is selected.

In this case, in the operation S830 where the decrypted message is provided, the decrypted message may be provided in at least one form of an opaque OSD form, a transparent OSD form, a window form different from a window where the instant messenger service screen is provided, and a form for directly providing the decrypted message to the instant messenger service screen.

Meanwhile, in the operation where the encrypted message is decrypted, when the instant messenger application supports the API that provides the information on the received message, the acquired text information may be decrypted through the API. When the instant messenger application does not support the API that provides the information on the received message, the acquired text information may be decrypted through at least one of the analysis of the drawing system that outputs the output message in the display (for example, "view system" of Android platform) and the OCR analysis on the captured image of the instant messenger service screen.

According to the above-described various embodiments, it is possible to protect user privacy through the encryption function with respect to the instant messenger service. In addition, the encryption function may be provided additionally without changing functions of the conventional messenger service or installing a new messenger application, thereby enhancing the user convenience.

Meanwhile, the method for controlling a user terminal device according to the above-described various embodiments may be provided to the user terminal device in a form of a program.

For example, while the security mode that provides the encryption function is activated, a non-transitory computer readable medium including a program for encrypting text information inputted in the instant messenger service screen and providing the encrypted text as an input messenger of a common instant messenger service may be provided to the user terminal device.

The non-transitory computer readable medium refers to a medium which may store data permanently or semi-permanently rather than storing data for a short time, such as, register, cache, memory, and the like, and may be readable by an apparatus. To be specific, the above-described various applications and programs may be stored in and provided through the non-transitory computer readable medium, such as, Compact Disc (CD), Digital Versatile Disk (DVD), hard disk, Blu-ray disk, Universal Serial Bus (USB), memory card, Read-Only Memory (ROM), and the like.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to those skilled in the art.

What is claimed is:

1. A terminal device that supports an instant messenger service, the device comprising:
   a display;
   a user interface; and
   at least one processor configured to:
   control the display to provide an instant message,
   control the user interface to receive a user interaction on an instant messenger
   based on a security mode of the terminal device configured to provide an encryption function being activated,
   encrypt text information inputted according to the user interaction, the encryption performed on the terminal device,
   provide the encrypted text information as an input message of the instant messenger, and
   transmit a signal for activating the security mode of another terminal device through a server,
   wherein the signal is transmitted through a channel different from a channel of the instant messenger.

2. The device as claimed in claim 1, wherein based on the security mode of the terminal device being inactivated, the at least one processor is further configured to provide the inputted text information as an input message of the instant messenger without encryption.

3. The device as claimed in claim 1, wherein the security mode of the terminal device is activated according to a predetermined event before the text information is inputted in a message input box in the instant messenger or activated according to a predetermined event after the text information is inputted.

4. The device as claimed in claim 1, wherein the security mode of the terminal device is activated according to a predetermined event in which a predetermined item is selected.

5. The device as claimed in claim 1, wherein the input message is transmitted to another terminal device through a server configured to manage the instant messenger service.

6. A method for controlling a terminal device that supports an instant messenger service, the method comprising:
   receiving, by at least one processor of the terminal device, a user interaction on an instant messenger;
   encrypting, by the at least one processor of the terminal device, based on a security mode of the terminal device configured to provide an encryption function being activated, text information inputted according to the user interaction and providing the encrypted text information as an input message of the instant messenger; and
   transmitting, using the at least one processor of the terminal device, a signal for activating the security mode of another terminal device through a server,
   wherein the signal is transmitted through a channel different from a channel of the instant messenger.

7. The method as claimed in claim 6, further comprising:
   providing, based on the security mode being inactivated, the inputted text information as an input message of the instant messenger without encryption.

8. A communication system with first and second user terminal devices that support an instant messenger service, the communication system comprising:
   a first terminal device configured to:
   based on a security mode of the first terminal device configured to provide an encryption function being activated, encrypt text information inputted according to a user interaction on an instant messenger,
   provide the encrypted text information as an input message of the instant messengers, and
   transmit a signal for activating the security mode of another terminal device through a server, and
   a second terminal device configured to:
   based on an output message of the instant messenger received from the first terminal device being an encrypted message, decrypt the encrypted message according to a predetermined event,
   provide the decrypted message to another display separate from a display of the second terminal device, and
   based on receiving the signal through a server, activate a security mode of the second user terminal device,
   wherein the signal is received through a channel different from a channel of the instant messenger.

* * * * *